Aug. 19, 1924.
C. F. SHOWALTER
VEHICLE JACK
Filed April 24, 1923
1,505,294
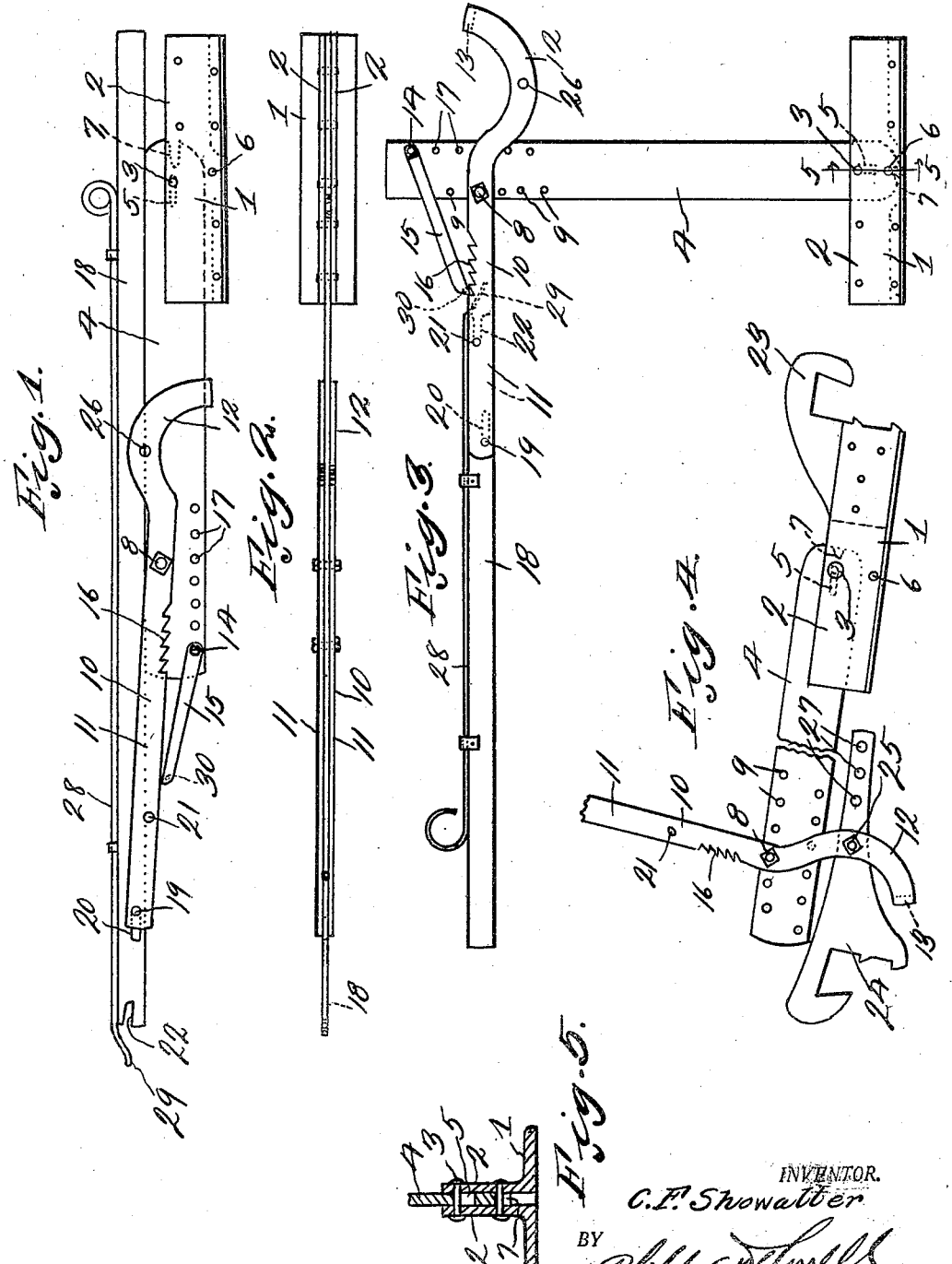
INVENTOR.
C. F. Showalter
BY
ATTORNEY.

Patented Aug. 19, 1924.

1,505,294

UNITED STATES PATENT OFFICE.

CHARLES F. SHOWALTER, OF OMAHA, NEBRASKA.

VEHICLE JACK.

Application filed April 24, 1923. Serial No. 634,268.

*To all whom it may concern:*

Be it known that CHARLES F. SHOWALTER, citizen of the United States, residing at Omaha, in the county of Douglas and State of Nebraska, has invented certain new and useful Improvements in Vehicle Jacks, of which the following is a specification, reference being had therein to the accompanying drawings.

The invention relates to vehicle jacks, and has for its object to provide a device of this character comprising a base, a vertically disposed standard and a pivoted lever pivoted to the standard. The standard is provided with locking means whereby it may be locked in a vertical position on the base, and the jack as a whole constructed in a manner whereby the jack may be folded into a compact package for storage purposes in an automobile.

A further object is to provide a relatively long foldable handle carried by the axle engaging lever whereby a great leverage may be obtained, and at the same time the jack may be placed under the rear axle of the vehicle and operated from a position behind the vehicle, thereby obviating the present difficulty experienced with jacks as at present constructed, wherein it is necessary for the operator to kneel beneath the rear portion of the vehicle for operating the jack.

A further object is to provide means whereby the jack can be used as a rim contractor and expander.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a side elevation of the jack showing the same folded for storage purposes.

Figure 2 is a top plan view of the jack showing the same folded.

Figure 3 is a side elevation of the jack showing the same in position for use.

Figure 4 is a side elevation of the jack showing the same positioned for use as a rim contractor or expanded.

Figure 5 is a detail sectional view through the base, taken on line 5—5 of Figure 3.

Referring to the drawing, the numeral 1 designates the base of the device, which base is preferably formed from angle iron as shown, and between the flanges 2 of which is pivotally mounted on a pin 3, a standard 4. The pin 3 extends through an elongated aperture 5 in the standard 4, therefore it will be seen that when the standard is moved to a vertical position as shown in Figure 3, the pin 6 which extends through the flanges 2 may be received in the recess 7 in the lower end of the standard for holding the standard in a vertical position, and at the same time allowing the standard to be folded to the position shown in Figure 1 for storage purposes.

Pivotally mounted on a bolt 8 which extends through one of the apertures 9 adjacent one side of the standard 4, is a lever 10, and by means of which bolt 8 and apertures 9 the lever may be adjusted at various distances from the ground according to the height of the axle to be raised. Lever 10 comprises the arms 11 which are disposed on opposite sides of the standard, and the segmentally shaped axle engaging member 12 formed from said arms, and which member, when the lever is in folded position as shown in Figure 1 has its opposite sides disposed on opposite sides of the standard 4, however the axle engaging ends of the arms 11 are connected together at 13 for limiting the movement of the lever in one direction during the folding operation. Pivotally connected at 14 to the standard 4 is a pawl 15, which pawl, during the axle jacking operation co-operates with teeth 16 on the lever 10 for holding the lever in any position to which it may be moved, and consequently holds the axle in raised position. The pawl 15 may be adjusted upwardly and downwardly to the various apertures 17 in the standard 4 according to the adjustment of the lever 10 on the standard 4 for properly co-operating with the teeth 16. It has been found in jacks as now constructed that especially where raising the rear axle of an automobile the handle members are entirely too short to allow the operator to manipulate the jack without kneeling beneath the rear end of the automobile. To obviate this difficulty the extension handle 18 is provided, which handle when extended allows the operator to stand to the rear of the vehicle and easily operate the jack without getting under the automobile. Extension handle 18 is pivotally mounted on a pin 19 extending through the arms 11 of the lever 10 and the pin 19 extends through an elongated aperture 20 in the extension handle 18, therefore it will be seen that the extension handle 18 has a limited longitudinal movement, sufficient to allow the pin 21 carried by the lever 10 to be received in the recess 22 in the inner end of the extension handle 18 for rigidly holding the lever 10 and the extension handle 18 in alignment and in position where the operator may easily manipulate the jack by grasping the outer end of the extension handle 18. The extension handle 18 also allows a greater leverage to be obtained, and consequently requires a relatively small amount of power for the jacking operation.

When the device is folded as shown in Figure 1, it will be seen that it may be stored within an automobile, for instance under the seat where it will be out of sight. By referring to Figure 4, wherein the device is shown for a rim contractor or expander, it will be seen that the base 1 is provided with a hooked member 23 adapted to engage over a demountable rim adjacent the split thereof, and that a hooked member 24 adapted to engage over a rim is provided and is pivotally connected to the portion 12 of the lever by means of a bolt 25 which extends through the hooked member 24 and apertures 26 in the lever 10. However for various sizes of rims the member 24 is provided with spaced apertures 27 through any of which the bolt may be passed, and through the apertures 26 to adjust the device for various diameters of demountable rims.

From the above it will be seen that a vehicle jack is provided, which may be folded into a compact package for storage purposes and constructed in such a manner whereby a maximum leverage may be obtained and the device used for a rim contractor and expander when so desired.

Slidably mounted on the bar 18 is a rod 28, the end 29 of which underlies a lug 30 carried by the pawl 15. When the rod is forced inwardly the end 29 thereof will engage the lug 30 and raise the pawl 15, thereby allowing the pawl to be disengaged by the operator without getting under the automobile.

The invention having been set forth what is claimed as new and useful is:—

1. A vehicle jack comprising a base, a standard having a slot and pin connection with the base whereby the standard may be held in vertical position or allowed to fold on the base, an axle engaging lever pivoted to the standard, a dog pivoted to the standard and cooperating with the lever, a foldable extension handle carried by the lever, said extension handle having a slot and pin connection with the lever.

2. The combination with a jack comprising a base, a standard pivotally connected to said base and foldable onto the base, a lever pivotally connected to the standard, of rim engaging members carried by said base and by said lever and forming means for engaging opposite sides of a rim, one of said rim engaging members being pivotally connected to the lever.

In testimony whereof I hereunto affix my signature.

CHARLES F. SHOWALTER.